United States Patent [19]

Takahashi

[11] Patent Number: 5,478,301
[45] Date of Patent: Dec. 26, 1995

[54] PUNCH PRESS SYSTEM

[75] Inventor: Yutaka Takahashi, Placentia, Calif.

[73] Assignee: Amada Engineering and Service Co., Inc., La Mirada, Calif.

[21] Appl. No.: 284,164

[22] Filed: Aug. 2, 1994

[51] Int. Cl.$^6$ .................................................. B23Q 3/155
[52] U.S. Cl. .......................... 483/11; 364/474.21; 483/1; 483/28
[58] Field of Search ................... 483/1, 28, 29, 483/8, 9, 4, 5, 11, 10; 364/474.21; 83/552

[56] References Cited

U.S. PATENT DOCUMENTS

| | | | |
|---|---|---|---|
| 4,977,804 | 12/1990 | Naito | 83/76.7 |
| 5,041,985 | 8/1991 | Fujita | 483/1 X |
| 5,046,014 | 9/1991 | Anjo | 364/474.21 X |
| 5,070,593 | 12/1991 | Sahashi et al. | 483/29 |
| 5,215,513 | 6/1993 | Maynard et al. | 483/29 |
| 5,298,006 | 3/1994 | Miyajima | 483/1 |
| 5,299,477 | 4/1994 | Miyajima | 483/5 X |
| 5,318,496 | 6/1994 | Takahashi et al. | 483/1 |
| 5,342,276 | 8/1994 | Fujiwara et al. | 483/29 |
| 5,350,347 | 9/1994 | Fujiwara et al. | 483/29 |
| 5,394,335 | 2/1995 | Rush | 364/474.21 |

FOREIGN PATENT DOCUMENTS

| | | | |
|---|---|---|---|
| 3833072 | 4/1990 | Germany | 483/28 |
| 109678 | 8/1979 | Japan | 483/28 |
| 127951 | 7/1985 | Japan | 364/474.21 |
| 99149 | 4/1988 | Japan | 483/29 |
| 274458 | 11/1990 | Japan | 364/474.21 |
| 8404267 | 11/1984 | WIPO | 364/474.21 |

*Primary Examiner*—William Briggs
*Attorney, Agent, or Firm*—Sandler, Greenblum & Bernstein

[57] ABSTRACT

To watch the condition of tools mounted on a turret punch press and an automatic tool changing unit, a control device performs a simulation of a punch processing on the basis of an NC program for the turret punch press. On the basis of the simulation, the control device calculate the number of times for which each tool mounted on the punch press performs punchings in the workpiece during the punch processing. From the number of times, the control device determine the abrasion loss of the tools mounted on the punch press and the automatic tool changing unit. The control device is also adapted to store a length by which a tool is shortened by a grinding processing to be made in a tool to sharpen the same.

4 Claims, 10 Drawing Sheets

CLEARANCE 0.3
TOOL DATA
```

|    |     | CONFIGURATION      | SIZE    | ANGLE OF TOOL DIRECTION |
|----|-----|--------------------|---------|-------------------------|
| S1 | T7  | SQUARE SHAPE       | 100*20  | 90                      |
| S2 | T9  | SQUARE SHAPE       | 20*10   | 40                      |
| S3 | T11 | ROUND SHAPE        | 15      |                         |
| S4 | T17 | OBLONG ROUND SHAPE | 5*20    | 30                      |

FIG.7

|    |                                       | CURRENT VALUE | MAXIMUM HIT NUMBER, MAXIMUM SHORTENED TOOL LENGTH |
|----|---------------------------------------|---------------|---------------------------------------------------|
| T1 | CUMULATIVE EFFECTIVE HIT NUMBER Nc    | 10,238        | 20,000                                            |
|    | CUMULATIVE SHORTENED TOOL LENGTH Lc   | 0.4 (mm)      | 3.0 (mm)                                          |
| T2 | CUMULATIVE EFFECTIVE HIT NUMBER Nc    | 8,369         | 15,000                                            |
|    | CUMULATIVE SHORTENED TOOL LENGTH Lc   | 1.0 (mm)      | 2.0 (mm)                                          |
| T3 | CUMULATIVE EFFECTIVE HIT NUMBER Nc    | 1.5035        | 30,000                                            |
|    | CUMULATIVE SHORTENED TOOL LENGTH Lc   | 0.9 (mm)      | 3.0 (mm)                                          |

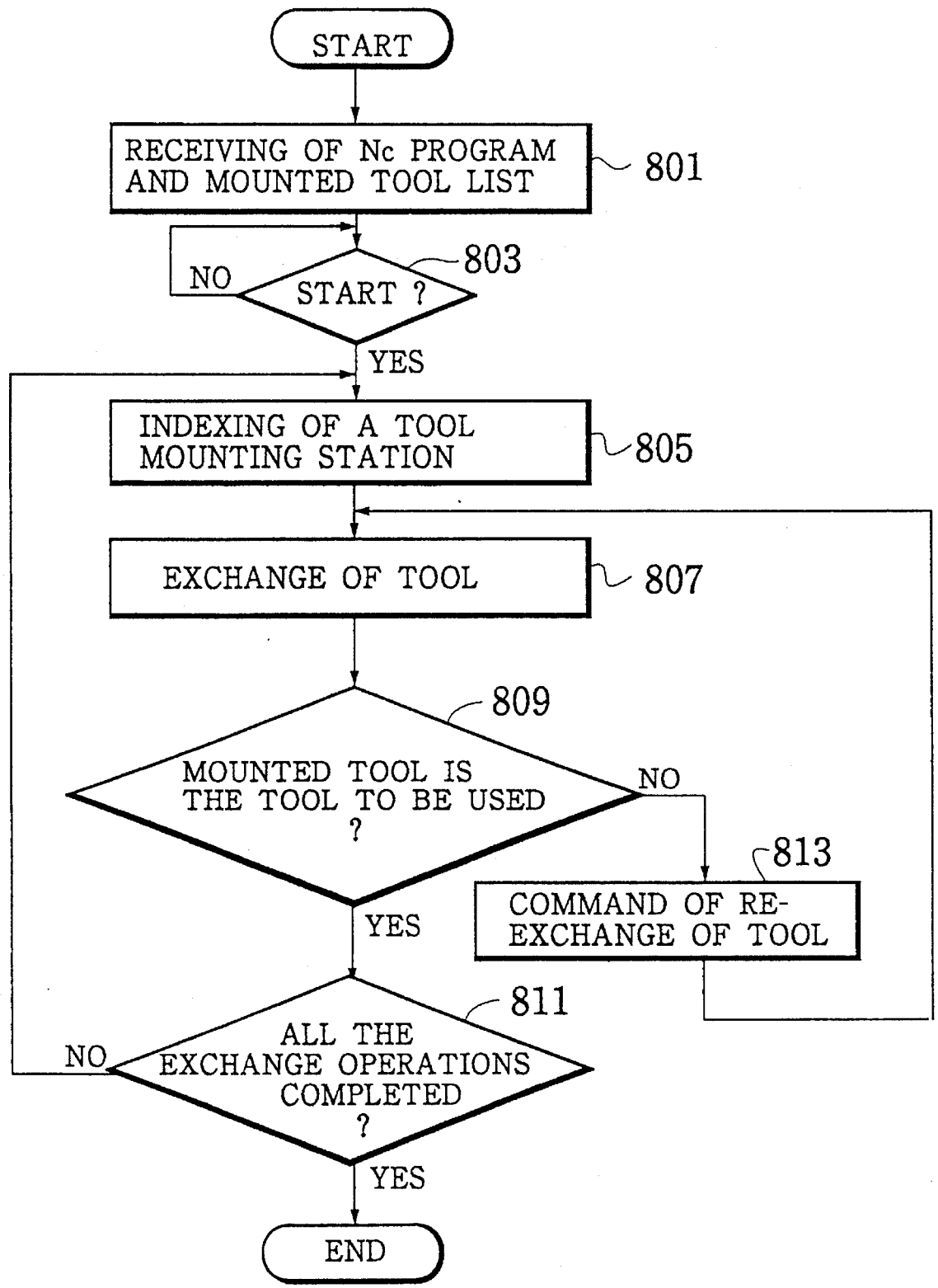

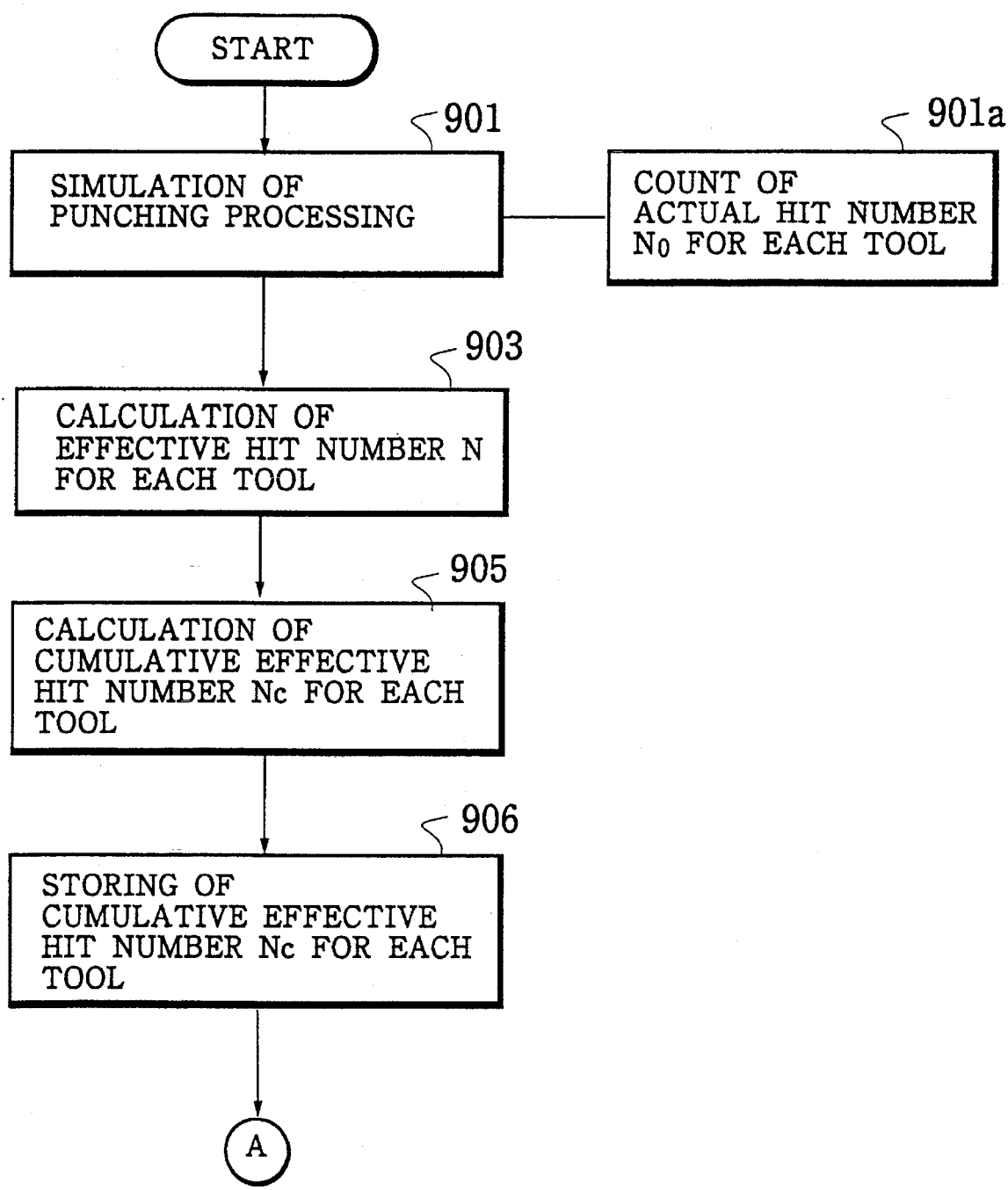

PUNCH PRESS SYSTEM

BACKGROUND OF THE INVENTION

1. Field of the Invention

The present invention relates to a punch press system, and in particular to a turret punch press system including a turret punch press and an automatic tool changing apparatus.

2. Prior Art

An example of a conventional turret punch press system is shown in U.S. Pat. No. 5,215,513. This system includes a turret punch press equipped with removable tools for performing punch processing in a sheet workpiece. The system also includes a tool changing apparatus, and a tool storage for storing a large number of tools. The tool changing apparatus removes a tool from the turret punch press, and transfers the same to the tool storage. Further, the apparatus takes out a new tool from the tool storage, and transfers the same to the turret punch press. The tool changing apparatus disclosed in U.S. Pat. No. 5,215,513 particularly includes a carriage movable between the turret punch press and the tool storage. Further, the turret punch press, the tool changing apparatus, and the tool storage are controlled by conventional NC control devices.

In the turret punch press system described above, a large number of tools stored in the tool storage are automatically supplied to the turret punch press, so that a variety of punchings can be automatically performed in a sheet workpiece by using a variety of tools.

In the conventional turret punch press system, however, control programs for the tool changing device and the tool storage are uniquely determined in relation to the control program for the turret punch press. Here the latter control program depends on the kind of the punch processing performed by the turret punch press. Thus each time the kind of the punch processing performed by the turret punch press is changed, the control programs for the tool changing device and the tool storage were changed. Such frequent changing of the control program was troublesome to an operator.

Further, when the tool of the turret punch press has performed a large number of punchings, the tools are worn away. Thus, the tools need to be ground to be sharpened. In a conventional turret punch press, in order to see whether the tools need to be ground, an operator examines the condition or the precision of punched holes formed by the tools. When the punched holes have dull edges, the punch tools are removed from the system and ground. However, the examination of the tool and the determination of the grinding of the tool was troublesome to the operator.

SUMMARY OF THE INVENTION

In order to solve the above-described problems, it is the first object of the present invention to provide a punch press system in which the control program for the automatic tool changing device needs not be changed even when the kind of the punch processing performed by the punch is changed.

It is the second object of the present invention to provide a punch press system which automatically watches the condition of the tools, and indicates when any of the tools is worn away and to be sharpened.

In order to achieve the first object, the punch press system of the present invention includes a punch press, a punch press control device, an automatic tool changing apparatus, and an ATC control device, the punch press being equipped with a plurality of tools removably mounted thereon. The punch press control device is adapted to store data identifying the tools mounted on the punch press. The automatic tool changing apparatus automatically changes tools on the punch press. The ATC control device for controlling the automatic tool changing apparatus is connected to the punch press control device, and adapted to receive the data identifying tools mounted on the punch press. The ATC control device is further adapted to receive the data identifying tools to be used in an actual punch processing. The ATC control device is still further adapted to perform the following steps:

(a) receiving from the punch press control device the data identifying the tools mounted on the punch press, (b) comparing the data identifying the tools mounted on the punch press with the data identifying the tools to be used in an actual punch processing, (c) detecting tools included in the tools to be used in the actual punch processing and not included in the tools mounted on the punch press, (d) controlling the automatic tool changing apparatus so that the tools detected in the step (c) are mounted on the punch press.

In order to achieve the second object, the punch press system of the present invention includes a punch press and a control device. The punch press is equipped with a plurality of tools removably mounted thereon and with a striker for striking a tool. The control device for controlling the punch press on the basis of an NC program is adapted to perform the following steps:

(a) on the basis of the NC program, performing a simulation of a punch processing to be made in a workpiece;

(b) on the basis of the result of the simulation, counting the number of times ($N_0$) for which each tool mounted on the punch press performs punchings in the workpiece during the punch processing;

(c) calculating an effective hit number (N) for each tool, the effective hit number (N) being proportional to the number of times ($N_0$) and indicative of the abrasion loss of each tool during the punch processing;

(d) calculating a cumulative effective hit number (Nc) for each tool by adding the effective hit number (N) to an old value of the cumulative effective hit number (Nc);

(e) comparing the cumulative effective hit number (Nc) with a maximum hit number (Nmx) for each tool;

(f) outputting a signal for sharpening a tool if the cumulative effective hit number (Nc) for the tool is greater than the maximum hit number (Nmx).

The effective hit number N for each tool may be defined by the formula, $$N = N_0 \times (T/T_0)^p \times (H/H_0)^q$$

where $N_0$ is the number of times for which each tool performs punchings in the workpiece during the punch processing; T and $T_0$ are actual and standard thickness of a workpiece, respectively; H and $H_0$ are actual and standard hardness of a workpiece, respectively. The p and q are parameters suitably determined by a test experiment.

BRIEF DESCRIPTION OF THE DRAWINGS

FIG. 6 is a view for illustration, showing an NC program for controlling the punch press shown in FIG. 2, the NC program being stored in a punch press control unit shown in FIG. 3.

FIG. 7 is a table showing certain conditions of the tools provided in the the punch press system, the table being stored in the ATC control unit in FIGS. 3, 4, and 5.

FIG. 8 is a flow chart showing a tool exchange operation performed by the turret punch system.

FIG. 9 which includes FIGS. 9A and 9B is a flow chart showing a tool check operation performed by the turret punch press system.

DETAILED DESCRIPTION OF THE PREFERRED EMBODIMENT

An embodiment of the invention will hereafter be described with reference to FIGS. 1–9.

Figure 1:
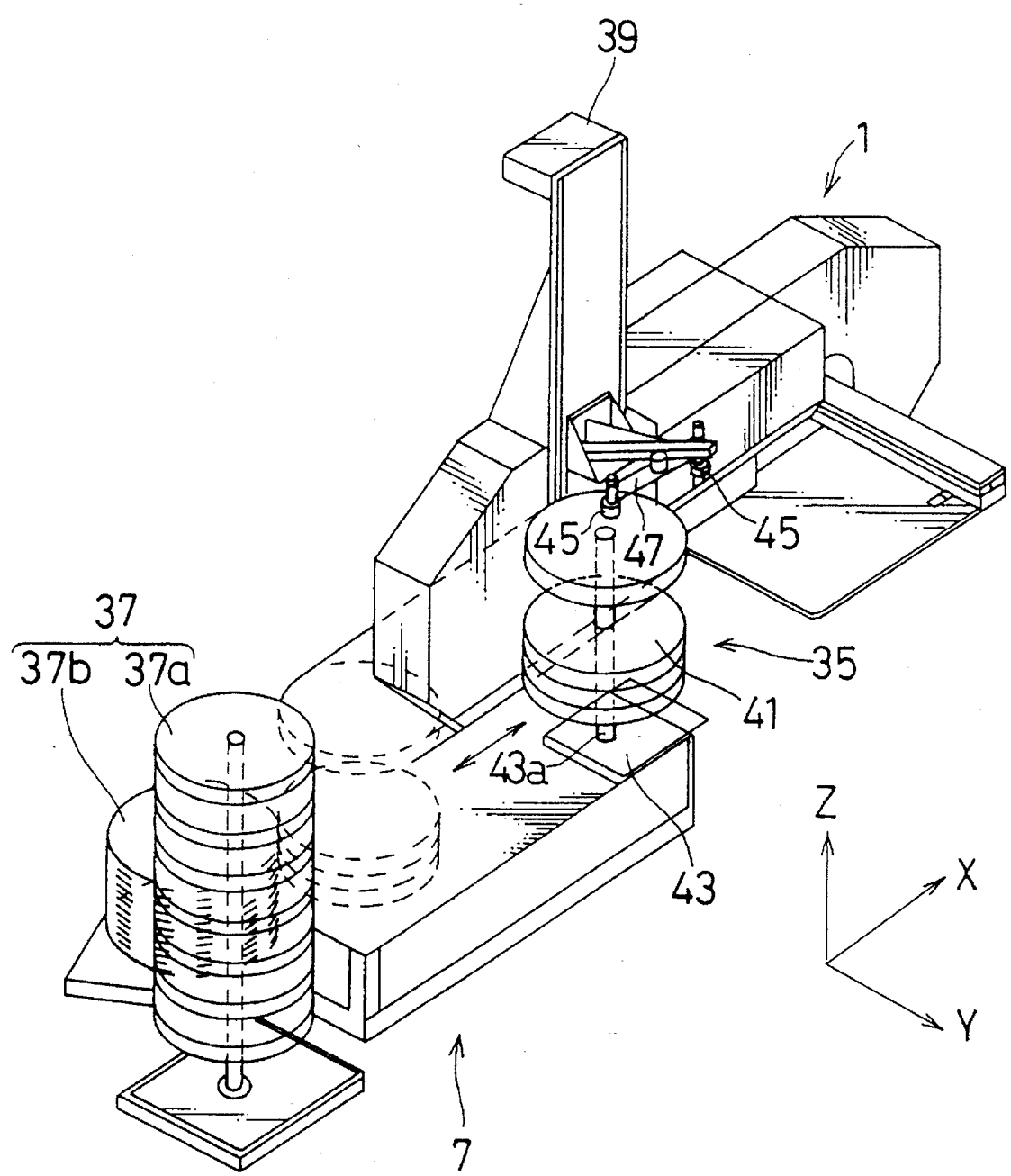
FIG. 1 is a schematic view showing an embodiment of punch press system of the present invention.
Figure 2:
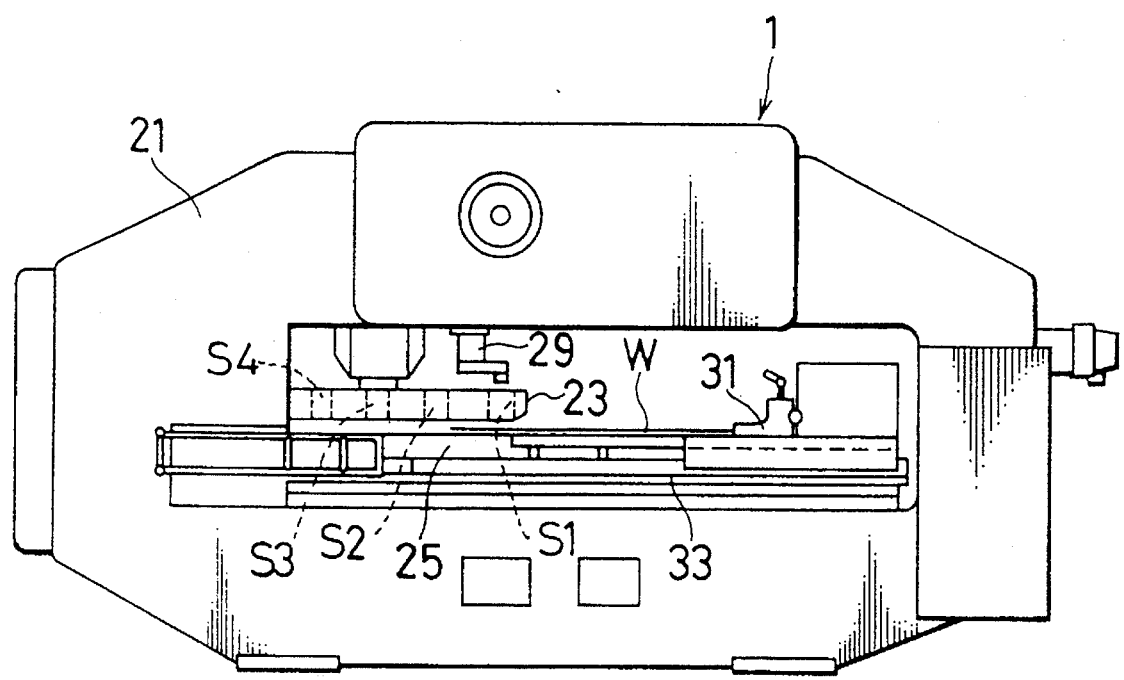
FIG. 2 is a front elevational view of a turret punch press shown in FIG. 1.

As shown in FIG. 1, the punch press system includes a punch press 1 and an automatic tool changing unit (ATC unit) 7. Referring to FIG. 2, the turret punch press 1 has a frame 21 of bridge structure. An upper rotatable turret 23 and a lower rotatable turret 25 are provided at a substantially central portion within the frame 21. A plurality of punches (not shown) are mounted on the upper turret 23, while a plurality of dies (not shown) are mounted on the lower turret 25. Each punch cooperates with one of the dies in performing a punch processing in a workpiece. A punch and die pair may be called as a tool. The upper and lower turrets 23, 25 are formed with a plurality of tool mounting stations S1, S2, S3, S4, . . . each for receiving the punch and die pair. Provided above the upper turret 23 is a striker 28. Thus, by rotation of the upper and lower turrets, the striker 28 selectively strikes one of the punch and die pairs mounted on the turrets. The turret punch press 1 is further provided with a workpiece clamping unit 31 for moving and positioning a workpiece W relative to the striker 28 while grasping the workpiece W.

With this arrangement, the punch and die pair can perform punch processings in suitable positions of a workpiece W provided between the upper and lower turrets 23 and 25.

Referring again to FIG. 1, the ATC unit 7 is provided with an exchange unit 35 for mounting a tool on and demounting the same from the upper and lower turrets 23, 25. Specifically, the exchange unit 35 includes a punch lifter 39 for mounting a punch on and demounting the same from the upper turret 23. Specifically, the punch lifter 39 is provided with a gripper 45 for grasping the punch, a rotary arm 47 for carrying the gripper 45, and a motor (not shown) for rotating the rotary arm 47.

The ATC unit 7 is further provided with a tool tower 37 for storing a large number of the punch and die pairs. In the embodiment shown in FIG. 1, the tool tower for storing punches is indicated by the numeral 37a, and the tool tower for storing dies is indicated by numeral 37b.

The ATC unit 7 is still further provided with a transfer unit 43 movable between the exchange unit 35 and the tool tower 37. Specifically, the transfer unit 43 is provided with a vertical shaft 43a. Rotary discs 41 for carrying the punch and die pairs are supported on the vertical shaft 43a so as to be movable along it and rotatable thereabout.

Thus, by making use of the exchange unit 35, a punch and die pair demounted from the upper and lower turret 23, 25 can be mounted on the rotary disc 41 of the transfer unit 43. The punch and die pair are then transferred to the tool tower 37 by the transfer unit 43. Similarly, a new punch and die pair taken out from the tool tower 37 is transferred to the exchange unit 35 by the transfer unit 43. In this way, new punch and die pairs are mounted on the upper and lower turret by the exchange unit 35.

Figure 3:
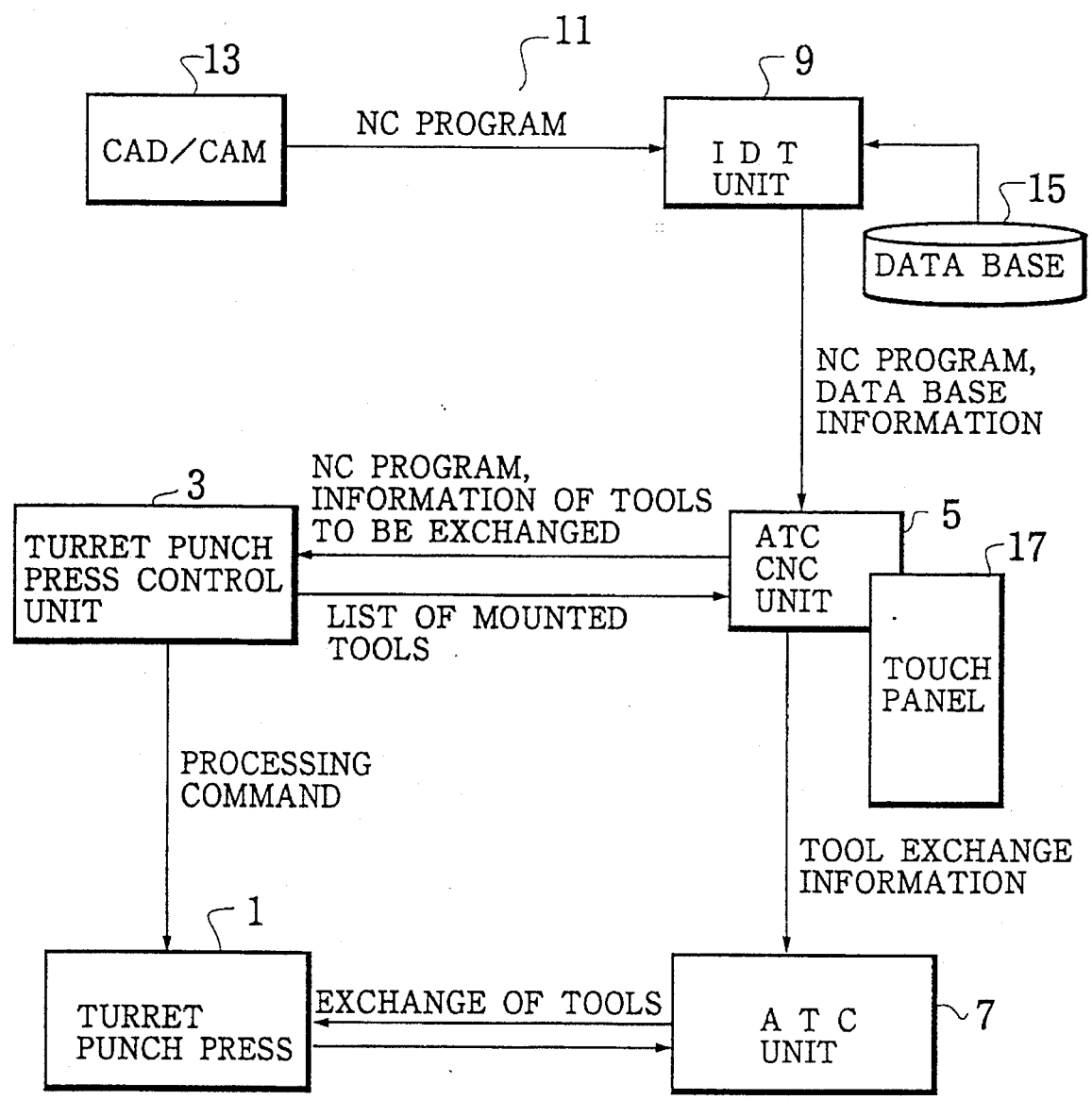
FIG. 3 is a block diagram showing an embodiment of a control system provided in the punch press system.

FIG. 3 shows a control system for controlling the turret punch press system. The control system includes a turret punch press control unit 3, an ATC computer numerical control unit (ATC-CNC unit) 5, an intelligent data terminal unit (IDT unit) 9, a data base 15, and a CAD/CAM device 13.

The turret punch press control unit 3 is for controlling the turret punch press 1. The ATC-CNC unit 5 controls the operation of the ATC unit 7. Specifically, the ATC-CNC prepares data for changing tools on the turret punch press, as will be described in detail hereinafter. The ATC-CNC unit 5 is connected to the turret punch press control unit 3 to receive therefrom a list of tools mounted on the turret punch press 1, and to provide thereto data concerning tools to be changed.

The IDT unit 9 is adapted to store data concerning punch processing. The data base 15 stores various data concerning tools mounted in the turret punch press 1, the ATC unit 7, and the tool tower 7. The data stored in the data base 15 includes cumulative effective hit numbers and cumulative shortened tool lengths for the tools, as will described in detail hereinafter. The CAD/CAM device 13 prepares an NC program 6 to be supplied to the turret punch press control unit 3 so as to control the turret punch press 1.

As shown in FIG. 3, a touch panel 17 is further provided at a front surface of a cathode ray tube (CRT) of the ATC-CNC unit 5. With the touch panel 17, a demand of an NC program, and data for a punch processing are input as will be described below. Specifically, the data for a punch processing includes data specifying the workpiece to be used in the punch processing, such as the thickness and the hardness of the workpiece.

With the arrangement described above, a demand of an NC program and data for the punch processing is first input via the touch panel 17. Then the ATC-CNC unit 5 send a signal demanding the NC program through the IDT unit 9 to the CAD/CAM device 13. Upon the receipt of the demanding signal, the CAD/CAM device provide the NC program with the IDT unit 9. The IDT unit 9 further receives data concerning the tools from the data base 15. The IDT 9 transmits both data to the ATC-CNC unit 5.

The ATC-CNC unit 5 receives the list of tools mounted on the turret punch press 1 from the turret punch press control unit 3. From the list of the tools mounted on the turret punch press and the NC program, the ATC-CNC unit 5 determines tools to be changed so as to perform the punch processing specified by the NC program.

The ATC-CNC unit 5 sends the data regarding the tool to be changed to the turret punch press control unit 3 and to the ATC unit 7. Specifically, the ATC-CNC unit 5 sends to the turret punch press control unit 3 data identifying tools to be removed from the turret punch press 1. Also the ATC-CNC unit 5 sends to the ATC-CNC unit 5 data identifying new tools to be mounted on the turret punch press 1.

On the basis of the data from the ATC-CNC unit 5, the upper and lower turret 23, 25 is rotated and the tools to be removed is moved to a position adjacent to the exchange unit 35. On the other hand, the transfer unit 43 of the ATC unit 7 presents new tools to a position adjacent to the exchange unit 35. Thus the exchange unit 35 changes tools on the turrets. Specifically, the exchange unit 35 replaces the old tools on the turrets 23, 25 with the new tools on the rotatable disc 41.

Figure 4:
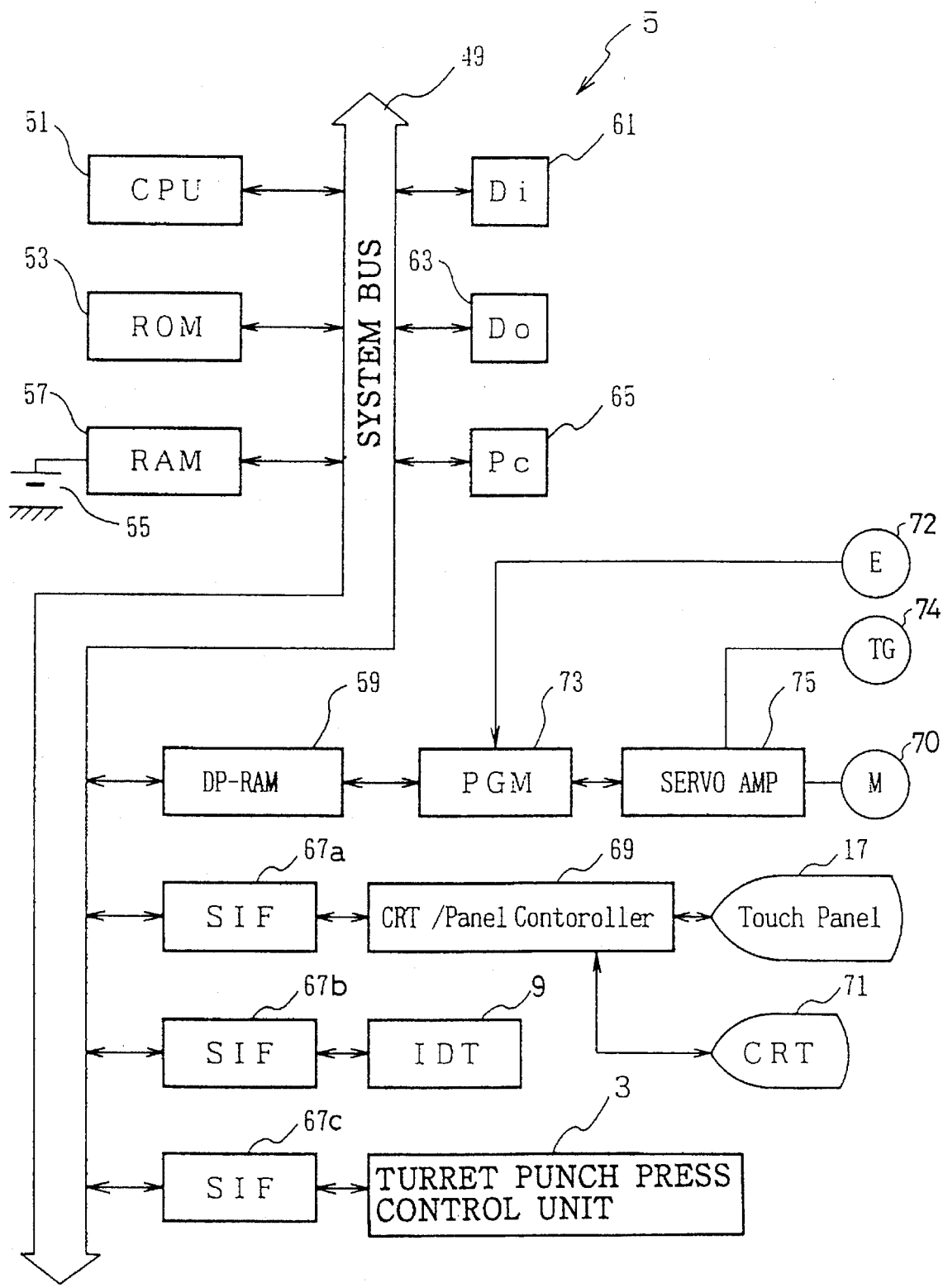
FIG. 4 is a view for illustration, showing a hard-ware arrangement of an ATC control unit shown in FIG. 3.

Referring to FIG. 4, a hardware arrangement of the ATC-CNC unit 5 will be described below. The ATC-CNC unit 5 includes the following elements: a CPU 51 and a ROM 53 for processing of data and controlling other elements; a RAM 57 backed up by a battery power source 55; a bidirectional RAM (DP-RAM) 59; a digital input (Di) 61 acting as an input section for data; a digital output (Do) 63 acting as an output section for data; a programmable controller (Pc) 65 for outputting various control signals; and serial interfaces 67a, b, c. As shown in FIG. 4, these elements are connected to each other through a system bus 49.

The touch panel 17 and a CRT screen 71 acting as means for inputting processing data are connected via a controller 69 to the serial interface 67a. Furthermore, the IDT unit 9 and the turret punch press control unit 3 are connected to the serial interfaces 67b, c, respectively.

A servomotor means 70 is equipped with encoder means 72 and tacho-generator means 74. The servomotor means 70 is connected via positioning module means 73 and a servo amplifier means 75 to the DP-RAM 59. The servomotor means 70 includes two servomotors (not shown) for moving the transfer unit 43 in an X-Z plane in FIG. 4, and a servomotor (not shown) for rotating the rotary disc 41.

Figure 5:
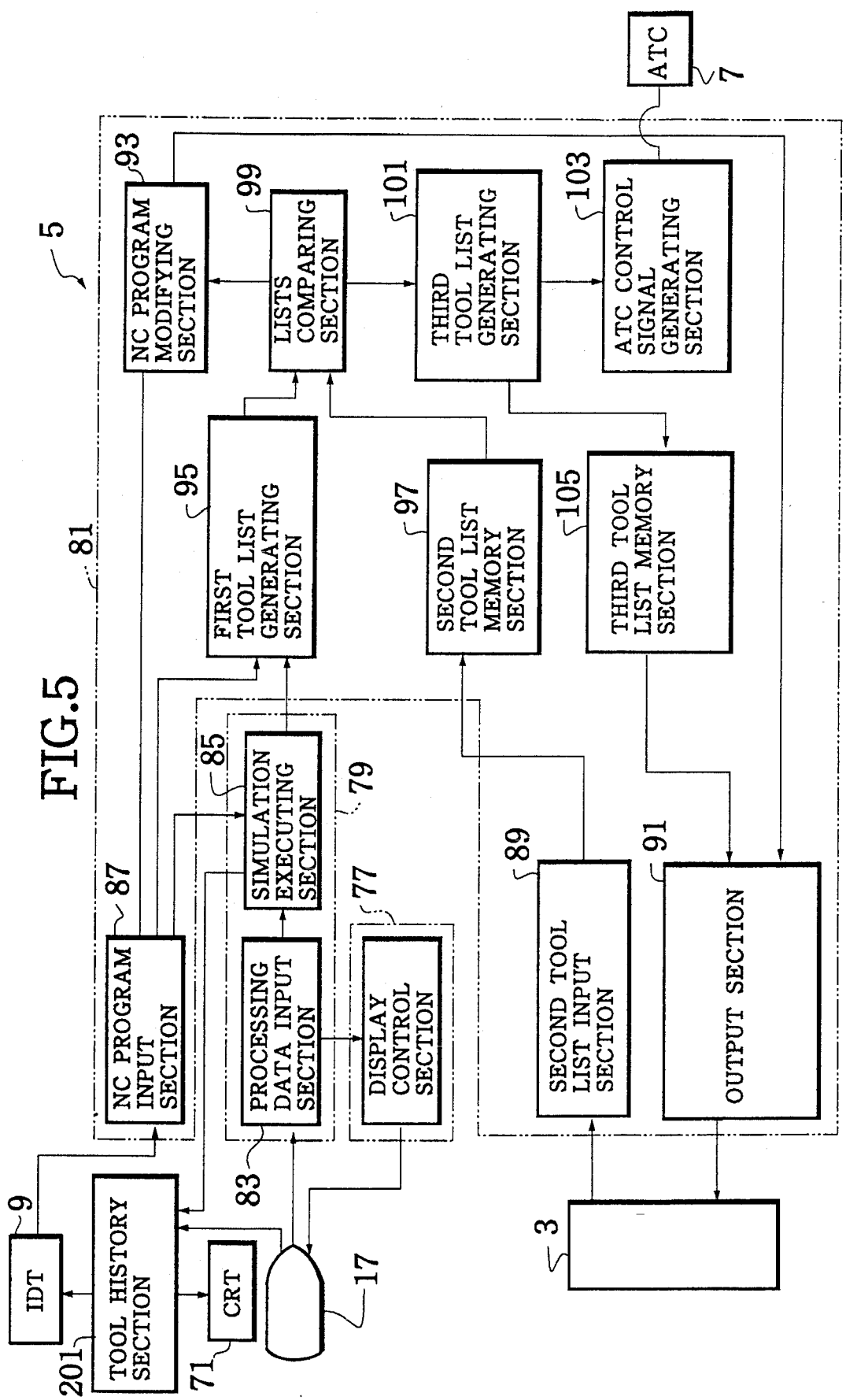
FIG. 5 is a block diagram showing the ATC control unit shown in FIGS. 3 and 4.

FIG. 5 shows the block diagram of the ATC-CNC unit 5. The ATC-CNC unit 5 generally includes a tool changing data generating section 81, a display control section 77, a simulation section 79, and a tool history section 201.

The tool changing data generating section 81 generates the data of tools to be exchanged. Specifically, the tool changing data generation section 81 includes an NC program input section 87 for receiving the NC program from the IDT unit 9.

Referring to FIG. 6, the NC program 11 input from the the IDT unit 9 includes tool data 11a for identifying the tools to be used in the punch processing. In FIG. 6, tools identified by numbers T9, T17, T11 are assumed to be mounted on tool stations S1, S2, S3, S4 on the turrets. Further, non-circular shape tools T7, T9, and T17 are assumed to face to directions oriented 90, 40, and 30 degrees away from a horizontal axis. These angles may be referred to tool angles below.

Referring again to FIG. 5, the NC program input section 87 provides the NC program to a first tool list generating section 95, an NC program modifying section 93, and a simulation execution section 85. The first tool list generating section 95 generates from the NC program a list of tools to be used in the processing ("a first tool list"). Here, the first tool list includes the tool numbers Ti (i=1, 2, 3, . . .) for identifying the tools, and the station numbers Si (i=1, 2, 3, . . .) on which tools are mounted, and the tool directions to which non-circular shape tools are faced. The first tool list is provided to a list comparing section 99.

The tool changing data generating section 81 also includes a second tool list input section 89. The second tool input section 89 receives a list of tools mounted on the turret punch press 1 ("a second tool list"), which is provided from the turret punch press control unit 3. The second tool list is sent through a second tool list memory section 97 to the list comparing section 99.

The list comparing section 99 compares the first tool list with the second tool list to determine the tools satisfying one of the following conditions:

(1) A tool included in the first tool list but not included in the second tool list;

(2) A tool included in the second tool list but not included in the first tool list;

(3) A tool mounted in a certain tool station in the first tool list and mounted in another tool station in the second tool list.

(4) A non-circular shape tool facing to a certain direction in the first tool list and facing to another direction in the second tool list.

The list comparing section 99 provides data identifying the tools satisfying the conditions (1), (2) to a third tool list generating section 101. The third tool list generating section 101 generates a third tool list including data identifying tools to be changed in the turret punch press. The output of the third tool list generating section 101 is provided to a ATC control signal generating section 103 and a third tool list memory section 105. The ATC control signal generating section 103 generates a signal for controlling the ATC unit 7 on the basis of the third tool list.

The third tool list memory section 105 momentarily stores the third tool list and provides the same to an output section 91.

The list comparing section 99 also provides data identifying tools satisfying conditions (3), (4) to an NC program modifying section 93. The NC program modifying section 93 modifies the NC program on the basis of the data from the list comparing section 99; thus, the tool stations for the tools in the NC program agree with the actual tool stations for the same tools in the turret punch press 1, and the tool directions for a non-circular shape tools in the NC program agree with the actual tool directions for the non-circular shape tools in the turret punch press 1. The NC program modifying section 93 provides the modified NC program to the output section 91. The output section 91 provides the third tool list and the modified NC program to the turret punch press control unit 3.

The display control section 77 controls the touch panel 17 and the CRT 71, so that pictures of control switches displayed on the CRT 71 work as actual control switches.

A simulation section 79 performs a simulation of a punch processing on the basis the NC program from the NC program input section 87. Specifically, the simulation section 79 includes a processing data input section 83 connected to the touch panel 17 and receiving therefrom workpiece data relating to a workpiece to be processed. The workpiece data include thickness and hardness of the workpiece. The processing data input section 83 sends the workpiece data to a simulation execution section 85. The simulation execution section 85 executes the simulation of a punch processing on the basis of the NC program and the workpiece data. Furthermore, the simulation execution section 85 calculates from the result of the simulation the number of times $N_0$ for which each tool mounted on the turrets performs punchings in the workpiece during the punch processing. This means that each tool is hit by the striker $N_0$ times during the punch processing. The number of times $N_0$ may thus be referred hereinafter to as a hit number or an actual hit number.

The simulation execution section 85 provides the actual hit number $N_0$ for each tool to the tool history section 201. On the basis of the actual hit number $N_0$, the tool history section calculates an effective hit number N for each tool indicating the abrasion loss of the tool during the punch processing. Specifically, the effective hit number N is equal to the actual hit number $N_0$ when the workpiece has a standard hardness and a standard thickness. And the effective hit number N increases with the hardness or the thickness of the workpiece. For example, the effective hit number N is calculated by the formula, $$N=N_0 \times (T/T_0)^p \times (H/H_0)^q$$

where $N_0$ is the actual hit number; T and $T_0$ are actual and standard thicknesses of a workpiece, respectively; H and $H_0$ are actual and standard hardnesses of a workpiece, respectively. The p and q are parameters suitably determined by a test experiment.

The tool history section 201 has a memory for storing the effective hit numbers N for every tools mounted in the turret punch press 1, the ATC unit 7, and the tool tower 37.

Further, the tool history section 201 calculates a cumulative effective hit number Nc for each tool on the basis of the effective hit number N. The cumulative effective hit number Nc is the sum of the effective hit numbers N for every punch processings each tool has performed during its history. Specifically, the cumulative effective hit number Nc is calculated as follows. That is, an effective hit number N for a punch processing performed in the simulation is added to a cumulative effective hit numbers Nc for punch processings made by the tool in the past.

The tool history section 201 compares the cumulative effective hit number Nc for each tool with a maximum hit number Nmx predetermined for each tool. When the cumulative effective hit number Nc is greater than the maximum hit number Nmx, a signal is generated indicating that the tool is to be removed and sharpened. Upon receiving such signal, the ATC unit 7 may remove the tool from the turret punch press 1. FIG. 7 shows an example of the cumulative effective hit numbers Nc and the maximum hit numbers Nmx for tools T1, T2, T3. In FIG. 7, the tool T1 has performed punchings effectively 10,238 times during its history, and the maximum hit number Nmx for the tool T1 is 20,000 times.

Now, when a tool is ground and sharpened many times, the length of the tool is shortened, and eventually the tool should be disposed of. In order to watch such condition of the tools, the tool history section 201 further stores a length L by which each tool is shortened by each grinding or sharpening processing. This length L is normally 0.1–0.2 mm for each grinding or sharpening. The length L may be referred hereinafter to a shortened tool length.

The tool history section 201 further calculates a cumulative shortened tool length Lc on the basis of the shortened tool length. The cumulative shortened tool length Lc is a sum of the shortened tool lengths L for every grinding or sharpening processings made in a tool during its history. The cumulative shortened tool length Lc is compared with a maximum shortened tool length Lmx. If the cumulative shortened tool length Lc is greater than the maximum shortened length Lmx, a signal is output for taking out the tool from the system. FIG. 7 shows examples of the cumulative shortened tool lengths Lc and the maximum shortened tool lengths for the tools T1, T2, T3. In FIG. 7, the tool T1 has been shortened by 0.4 mm, and is to be disposed of when it is shortened by 3.0 mm.

FIG. 8 is a flow chart of tool exchange operation performed by the turret punch press system described above. In a step 801, an NC program prepared by the CAD/CAM 13, and a list of tools mounted on the turret punch press 1 prepared by the turret punch press control unit 3 are received by the ATC-CNC unit 5.

In a step 803, it is checked whether the exchange of tool is necessary. If the exchange of tool is necessary, an operator pushes a start button displayed on the touch panel 17.

In a step 805, tool mounting stations S1, S2, S3, S4, . . . supporting tools to be exchanged are indexed one by one to a tool exchange position adjacent to the exchange unit 35. Here the operator may touch the touch panel 17 to designate the tool mounting stations S1, S2, S3, S4, . . . so that they are indexed to the tool exchange position.

When a tool mounting station S1, for example, is indexed to the tool exchange position, the exchange unit 35 starts the tool exchange operation (step 807). The tool exchange operation is such that the unnecessary tool is removed from the tool mounting station S1 and mounted on the rotary disc 41 of the transfer unit 43. A new tool is then taken out from the rotary disc 41 and mounted on the tool mounting station S1. If necessary, the direction of a non-circular shape tool is also changed by the exchange unit 35.

When the tool exchange operation for the tool is completed, it is checked whether the mounted tool is actually a tool to be used in the punch processing (step 809).

If the mounted tool is not the tool to be used in the punch processing, the program proceeds to a step 813 where a command of re-exchange of tool is output.

If in the step 809, the mounted tool is actually the tool to be used in the punch processing, the program proceeds to a step 811 where it is checked whether all the exchange operations have been completed. If all the exchange operations have not been completed, the program returns to the step 805.

Figure 9B:
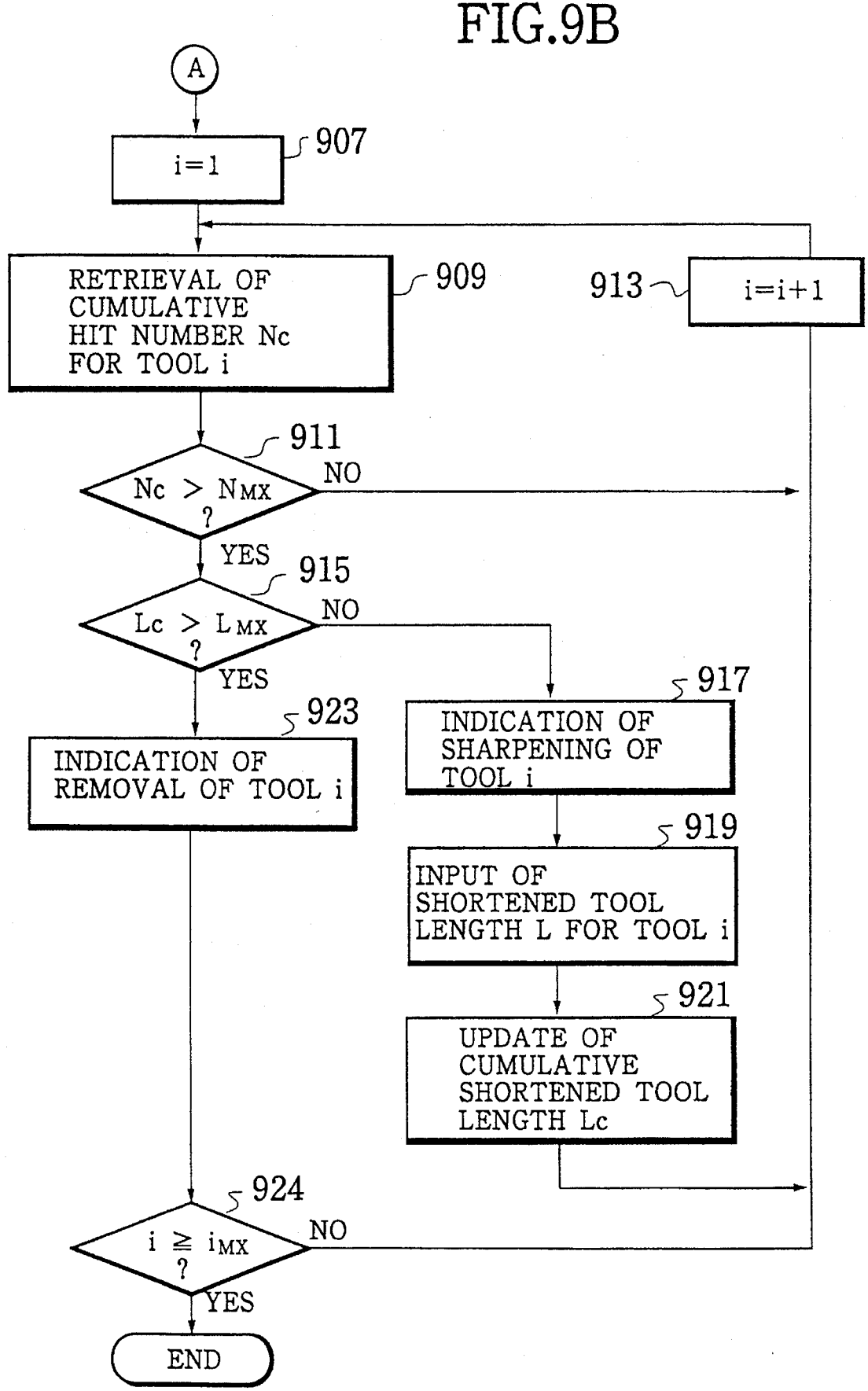

FIG. 9 is a flow chart showing a tool condition check operation performed by the turret punch press system described above.

In a step 901, a simulation of a punch processing based upon an NC program is performed by the simulation section 79. Here, as shown in a step 901a, the actual hit number $N_0$ is counted for each tool.

In a step 903, the effective hit number N is calculated for each tool on the basis of the actual hit number $N_0$.

In a step 905, the cumulative effective hit number Nc is calculated for each tool by adding the effective hit number N to the cumulative effective hit number Nc for past punch processing.

In a step 906, the cumulative effective hit number Nc for each tool is stored in a memory.

In a step 907, a tool number i identifying a tool whose condition is to be checked is set for 1.

In a step 909, the cumulative effective hit number Nc for the tool i is retrieved from the memory.

In a step 911, it is checked whether the cumulative effective hit number Nc is greater than the maximum hit number Nmx.

If the cumulative effective hit number Nc is less than the maximum hit number Nmx, the program proceeds to a step 913 where the tool number i is increased by 1. Then the steps 909 and 911 are carried out again.

If in the step 911, the cumulative effective hit number Nc is greater than the maximum hit number Nmx, the program proceeds to a step 915. In the step 915, it is checked whether the cumulative shortened tool length Lc is greater than the maximum shortened tool length Lmx.

If the cumulative shortened tool length Lc is less than the maximum shortened tool length Lmx, the program proceeds to a step 917 where a signal is output indicating that the tool i should be ground or sharpened.

In a step 919, the shortened tool length L for the tool i indicating the length by which the tool i is to be shortened by the grinding or sharpening process is input.

In a step 921, the shortened tool length L is added to the the cumulative shortened tool length Lc for grinding or sharpening made to the tool in the past. Thus the cumulative shortened tool length Lc is updated.

If in the step 915, the cumulative shortened tool length Lc for the tool i is greater than the maximum shortened tool length Lmx, the program proceeds to a step 923. In the step 923, a signal is output indicating that the tool is to be removed from the system and disposed of.

In a step 924, it is checked whether the tool number i is equal to or greater than a predetermined maximum tool number imx indicating number of tools to be checked in the tool check operation process. If the tool number i is less than the predetermined maximum tool number imx, the program returns to the step 913 where the tool number i is increased by 1.

With the arrangement described above, the actual hit number for each tool is calculated by a simulation before an actual punch processing being performed. Thus the fact that the abrasion loss of a tool will exceed the predetermined maximum abrasion loss during the punch processing can be detected in advance. Here it is to be noted that a tool having an abrasion loss exceeding the maximum abrasion loss will make a hole having a crude edge. It is also noted that the maximum abrasion loss of the tool corresponds to the maximum hit number Nmx.

Further, in the above embodiment, from the actual hit number $N_o$, the effective hit number N is calculated taking account of the hardness and the thickness of a workpiece to be processed. Thus the abrasion loss of each tool can be precisely evaluated.

What is claimed is:

1. A punch press system comprising:

a punch press for performing punch processing in a sheet workpiece, the punch press being equipped with a plurality of tools removably mounted thereon;

a punch press control device for controlling the punch press, the punch press control device being adapted to store data for identifying the tools mounted on the punch press;

an automatic tool changing apparatus for automatically changing tools mounted on the punch press; and an ATC control device for controlling the automatic tool changing apparatus, the ATC control device being connected to the punch press control device and adapted to receive data identifying tools mounted on the punch press, the ATC control device being further adapted to receive the data identifying tools to be used in a punch processing in the punch press, and the ATC control device being still further adapted to perform the steps of:

(a) receiving from the punch press control, device the data identifying the tools mounted on the punch press, (b) comparing the data identifying the tools mounted on the punch press with the data identifying the tools to be used in the punch processing, (c) detecting tools included in the tools to be used in the punch processing and not included in the tools mounted on the punch press, (d) controlling the automatic tool changing apparatus so that the tools detected in the step (c) are mounted on the punch press.

2. The system of claim 1, wherein the ATC control device further performs the steps of:

(e) after the step (b), detecting tools that are included in the tools mounted on the punch press but not included in the tools to be used in the punch processing, (f) controlling the automatic tool changing apparatus so that the tools detected in the step (e) are removed from the punch press.

3. The system of claim 1, wherein the punch press is a turret punch press equipped with rotatable turrets for supporting the tools, and when tools on the turrets are to be changed, the turrets are rotated so that the tools to be changed are moved to a tool changing position to which the automatic tool changing apparatus is accessible to change the tools.

4. The system of claim 1, wherein the automatic tool changing apparatus comprises a tool tower for storing a plurality of tools, and a transfer unit movable between the tool tower and the punch press.

\* \* \* \* \*

UNITED STATES PATENT AND TRADEMARK OFFICE
CERTIFICATE OF CORRECTION

PATENT NO. : 5,478,301
DATED : December 26, 1995
INVENTOR(S) : Yutaka TAKAHASHI

It is certified that error appears in the above-indentified patent and that said Letters Patent is hereby corrected as shown below:

At column 3, line 15, change "FIG. 9" to ---FIG. 9.---.

At column 3, line 15, change "9B" to ---9B.---.

At column 5, line 3, change "is" to ---are---.

At column 5, line 48, delete "the" (second occurrence).

At column 6, line 42, delete "a".

At column 9, line 9, delete "the".

At column 10, line 13 (claim 1, line 20), change "control." to ---control---.

Signed and Sealed this

Seventeenth Day of September, 1996

Attest:

BRUCE LEHMAN

Attesting Officer    Commissioner of Patents and Trademarks